(12) United States Patent
Banerjea et al.

(10) Patent No.: US 8,743,851 B2
(45) Date of Patent: *Jun. 3, 2014

(54) MULTI-CHANNEL WIRELESS COMMUNICATIONS

(71) Applicant: Marvell World Trade Ltd., St. Michael (BB)

(72) Inventors: Raja Banerjea, Sunnyvale, CA (US); Yong Liu, Campbell, CA (US); Hongyuan Zhang, Fremont, CA (US); Harish Ramamurthy, Cupertino, CA (US); Sudhir Srinivasa, Campbell, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/794,158

(22) Filed: Mar. 11, 2013

(65) Prior Publication Data

US 2013/0201835 A1 Aug. 8, 2013

Related U.S. Application Data

(63) Continuation of application No. 12/945,805, filed on Nov. 12, 2010, now Pat. No. 8,395,997.

(60) Provisional application No. 61/329,905, filed on Apr. 30, 2010, provisional application No. 61/316,268, filed on Mar. 22, 2010, provisional application No. 61/312,135, filed on Mar. 9, 2010, provisional application No. 61/261,108, filed on Nov. 13, 2009.

(51) Int. Cl.
*H04W 4/00* (2009.01)
*H04W 74/08* (2009.01)
*H04W 84/12* (2009.01)

(52) U.S. Cl.
CPC .............. *H04W 74/08* (2013.01); *H04W 84/12* (2013.01)
USPC .......................................... 370/338; 370/462

(58) Field of Classification Search
None
See application file for complete search history.

(56) References Cited

U.S. PATENT DOCUMENTS 7,804,800 B2  9/2010  Li
8,270,909 B2  9/2012  Zhang et al.
(Continued)

OTHER PUBLICATIONS

"Draft Supplement to Standard [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band," IEEE Std. 802.11g (2003), 69 pages.

(Continued)

*Primary Examiner* — Kevin C Harper

(57) ABSTRACT

Systems and techniques relating to wireless communications are described. A described technique includes monitoring wireless communication channels, including a first channel and a second channel, to produce a monitoring output, determining a first transmission period for the first channel by applying a first waiting period duration and a second waiting period duration to the monitoring output, determining a second transmission period for the second channel by applying the first waiting period duration and the second waiting period duration to the monitoring output, causing, based on the first transmission period, a first transmission on the first channel to reserve the group of wireless communication channels; causing, based on the second transmission period, a second transmission on the second channel; and monitoring, after the end of the first transmission period, for an acknowledgement(s). An end of the second transmission period can be aligned with an end of the first transmission period.

21 Claims, 13 Drawing Sheets

(56) References Cited

U.S. PATENT DOCUMENTS

| | | | |
|---|---|---|---|
| 8,379,757 | B1 | 2/2013 | Zhang et al. |
| 8,395,997 | B2* | 3/2013 | Banerjea et al. ............ 370/241 |
| 2005/0208956 | A1* | 9/2005 | Takagi et al. ............... 455/464 |
| 2007/0153754 | A1 | 7/2007 | Shapira et al. |
| 2010/0260138 | A1 | 10/2010 | Liu et al. |
| 2010/0284393 | A1 | 11/2010 | Abraham et al. |
| 2011/0038332 | A1 | 2/2011 | Liu et al. |
| 2011/0044298 | A1* | 2/2011 | Wentink et al. ............. 370/336 |
| 2011/0299514 | A1 | 12/2011 | Kwon |

OTHER PUBLICATIONS

"Part 11: Wireless LAN Medium Access Control (MAC) and Physical Layer (PHY) specifications: Higher-Speed Physical Layer Extension in the 2.4 GHz Band", IEEE Std 802.11a, 1999, 91 pages.

"Part II: Wireless LAN Medium Access Control (MAC) and Physical Layer (PHY) specifications: Higher-Speed Physical Layer Extension in the 2.4 GHz Band," IEEE Std. 802.11b (1999), 96 pages.

"TGn Sync Proposal Technical Specification", IEEE Std. 802.11n, 2005, 131 pages.

Cariou et al., "Multi-Channel Transmissions," 802.11 TGac, IEEE, 802.11-09/1022r0, Sep. 21, 2009, 13 pages.

Rosken, Wilfriend, Authorized Officer, European Patent Office, PCT International Application No. PCT/US2010/056619, in International Search Report mailed Mar. 2, 2011, 10 pages.

Supplement to Carrier Sense Multiple Access with Collision Detection (CSMA/CD) Access Method and Physical Layer Specifications—Frame Extensions for Virtual Bridged Local Area Network (VLAN) Tagging on 802.3 Networks, IEEE Std 802.3ac-1998, 19 pages.

Zhang et al., "Exploiting Multi-Antennas for Opportunistic Spectrum Sharing in Cognitive Radio Networks," IEEE The 18th Annual IEEE International Symposium on Personal, Indoor and Mobile Radio Communications (PIMRC), 2007, 5 pages.

Information technology—Telecommunications and information exchange between systems-Local and metropolitan networks—specific requirements. Part 11: Wireless LAN Medium Access Control (MAC) and Physical Layer (PHY) Specifications, IEEE Std. 802.11n, Oct. 29, 2009, 213 pages.

* cited by examiner

MULTI-CHANNEL WIRELESS COMMUNICATIONS

CROSS REFERENCE TO RELATED APPLICATIONS

This disclosure is a continuation of and claims the benefit of the priority of U.S. patent application Ser. No. 12/945,805, filed Nov. 12, 2010 and entitled "Multi-Channel Wireless Communications," which claims: the benefit of the priority of U.S. Provisional Application Ser. No. 61/329,905, filed Apr. 30, 2010 and entitled "11ac Multi-Channel Support"; the benefit of the priority of U.S. Provisional Application Ser. No. 61/316,268, filed Mar. 22, 2010 and entitled "11ac Multi-Channel Support"; the benefit of the priority of U.S. Provisional Application Ser. No. 61/312,135, filed Mar. 9, 2010 and entitled "11ac Multi-Channel Support"; and the benefit of the priority of U.S. Provisional Application Ser. No. 61/261,108, filed Nov. 13, 2009 and entitled "11ac Band Support." All of the above identified applications are incorporated herein by reference in their entirety.

BACKGROUND

This disclosure relates to wireless communication systems, such as Wireless Local Area Networks (WLANs).

Wireless communication systems can include multiple wireless communication devices that communicate over one or more wireless channels. When operating in an infrastructure mode, a wireless communication device called an access point (AP) provides connectivity with a network, such as the Internet, to other wireless communication devices, e.g., client stations or access terminals (AT). Various examples of wireless communication devices include mobile phones, smart phones, wireless routers, and wireless hubs. In some cases, wireless communication electronics are integrated with data processing equipment such as laptops, personal digital assistants, and computers.

Wireless communication systems, such as WLANs, can use one or more wireless communication technologies, such as orthogonal frequency division multiplexing (OFDM). In an OFDM based wireless communication system, a data stream is split into multiple data substreams. Such data substreams are sent over different OFDM subcarriers, which can be referred to as tones or frequency tones. WLANs such as those defined in the Institute of Electrical and Electronics Engineers (IEEE) wireless communications standards, e.g., IEEE 802.11a, IEEE 802.11n, or IEEE 802.11ac, can use OFDM to transmit and receive signals.

Wireless communication devices in a WLAN can use one or more protocols for medium access control (MAC) and physical (PHY) layers. For example, a wireless communication device can use a Carrier Sense Multiple Access (CSMA) with Collision Avoidance (CA) based protocol for a MAC layer and OFDM for the PHY layer.

Some wireless communication systems use a single-in-single-out (SISO) communication approach, where each wireless communication device uses a single antenna. Other wireless communication systems use a muitiple-in-multiple-out (MIMO) communication approach, where a wireless communication device, for example, uses multiple transmit antennas and multiple receive antennas. A MIMO-based wireless communication device can transmit and receive multiple spatial streams over multiple antennas in each of the tones of an OFDM signal.

SUMMARY

The present disclosure includes systems and techniques for wireless communications.

According to an aspect of the present disclosure, a technique for wireless communications includes monitoring wireless communication channels, including a first channel and a second channel, to produce a monitoring output, determining a first transmission period for the first channel based on the monitoring output, determining a second transmission period for the second channel based on the monitoring output, transmitting, based on the first transmission period, a first packet on the first channel to cause one or more wireless communication devices to set a transmission protection period for the first channel and the second channel based on a reception of the first packet, transmitting, based on the second transmission period, a second packet on the second channel, and monitoring, after the end of the first transmission period, for one or more acknowledgements. Determining a first transmission period for the first channel can include applying a first inter-packet duration and a second inter-packet duration to the monitoring output, where the second duration is shorter than the first duration, Determining a second transmission period for the second channel can include applying a first inter-packet duration, a second inter-packet duration, or a combination thereof to the monitoring output. An end of the second transmission period can be aligned with an end of the first transmission period.

According to an aspect of the present disclosure, a technique for wireless communications includes monitoring wireless communication channels, including a first channel and a second channel, to produce a monitoring output, determining a first transmission period for the first channel by applying a first Interframe Space (IFS) duration and a second IFS duration to the monitoring output, wherein the second duration is shorter than the first duration, determining a second transmission period for the second channel by applying the first IFS duration and the second IFS duration to the monitoring output, transmitting, based on the first transmission period, a first packet on the first channel to cause one or more wireless communication devices to set a transmission protection period for the first channel and the second channel based on a reception of the first packet, transmitting, based on the second transmission period, a second packet on the second channel, and monitoring, after the end of the first transmission period, for one or more acknowledgements. An end of the second transmission period can be aligned with an end of the first transmission period.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Systems and apparatuses can include processor electronics configured to monitor wireless communication channels, including a first channel and a second channel, to produce a monitoring output, determine a first transmission period for the first channel by applying a first IFS duration and a second IFS duration to the monitoring output, wherein the second duration is shorter than the first duration, determine a second transmission period for the second channel by applying the first IFS duration and the second IFS duration to the monitoring output, control a transmission, based on the first transmission period, of a first packet on the first channel to cause one or more wireless communication devices to set a transmission protection period for the first channel and the second channel based on a reception of the first packet, control a transmission, based on the second transmission period, a second packet on the second channel, and monitor, after the end of the first transmission period, for one or more acknowledgements.

These and other implementations can include one or more of the following features. Implementations can include circuitry to transmit and receive on wireless communication channels. Implementations can include circuitry to access wireless communication channels, which can include circuitry to receive samples from an analog-to-digital converter and circuitry to send data to a digital-to-analog converter. In some implementations, the first duration is an Arbitration IFS (AITS) duration. In some implementations, the second duration is a Point Coordination Function IFS (PIFS) duration. In some implementations, the processor electronics are configured to monitor for wireless traffic on the wireless communication channels with respect to the first duration and the second duration. The processor electronics, in response to the monitoring output indicating a presence of traffic on the first channel during a period based on the AIFS duration, can be configured to determine the first transmission period based on an end of the PIFS duration. The processor electronics, in response to the monitoring output indicating a presence of traffic on the second channel during a period based on the AIFS duration, can be configured to determine the second transmission period based on an end of the PIFS duration. In some cases, the first packet is transmitted to a first wireless communication device that is configured for communications based on a first wireless communication standard, and the second packet is transmitted to a second wireless device that is configured for communications based on a second wireless communication standard, where the first channel is used by each of the first wireless communication standard and the second wireless communication standard. In some implementations, the first packet includes a field indicative of a length of the first packet. In some implementations, the processor electronics are configured to set the field to indicate a downlink Orthogonal Frequency-Division Multiple Access transmission. In some implementations, the first packet and the second packet are transmitted to the same wireless communication device, and the wireless communication channels are associated with an overlapping basic service set (OBSS) configured for communications based on 80 MHz, 120 MHz, or 160 MHz bandwidths.

Details of one or more implementations are set forth in the accompanying drawings and the description below. Other features and advantages may be apparent from the description and drawings, and from the claims.

DRAWING DESCRIPTIONS

FIGS. 5A, 5B, 5C, and 5D show different examples of communication flows via multiple channels.

Figure 6:
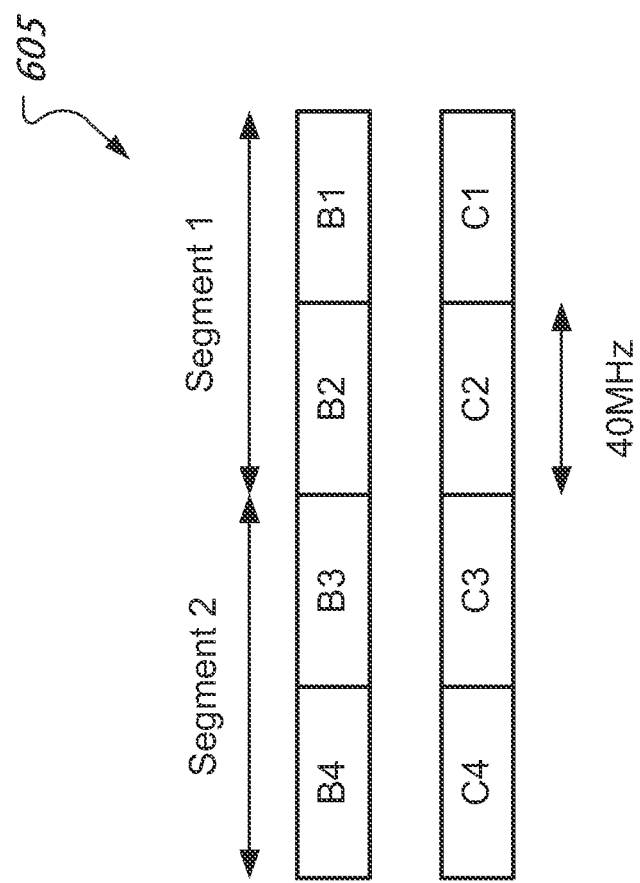

FIG. 6 shows an example of a bandwidth indication for downlink Orthogonal Frequency-Division Multiple Access (OFDMA).

Figure 7A:
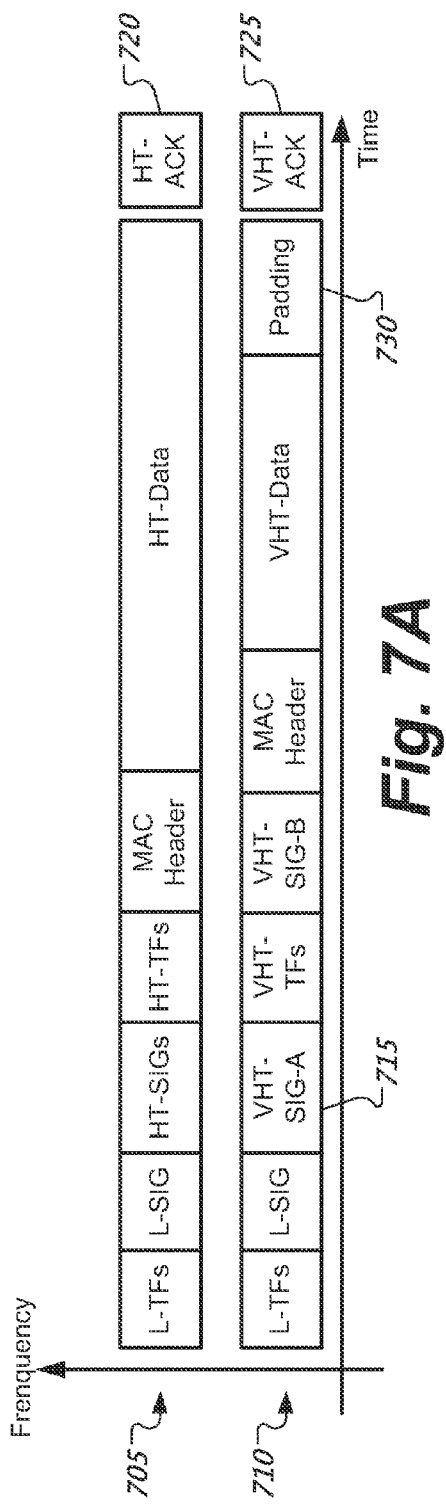
Figure 7B:
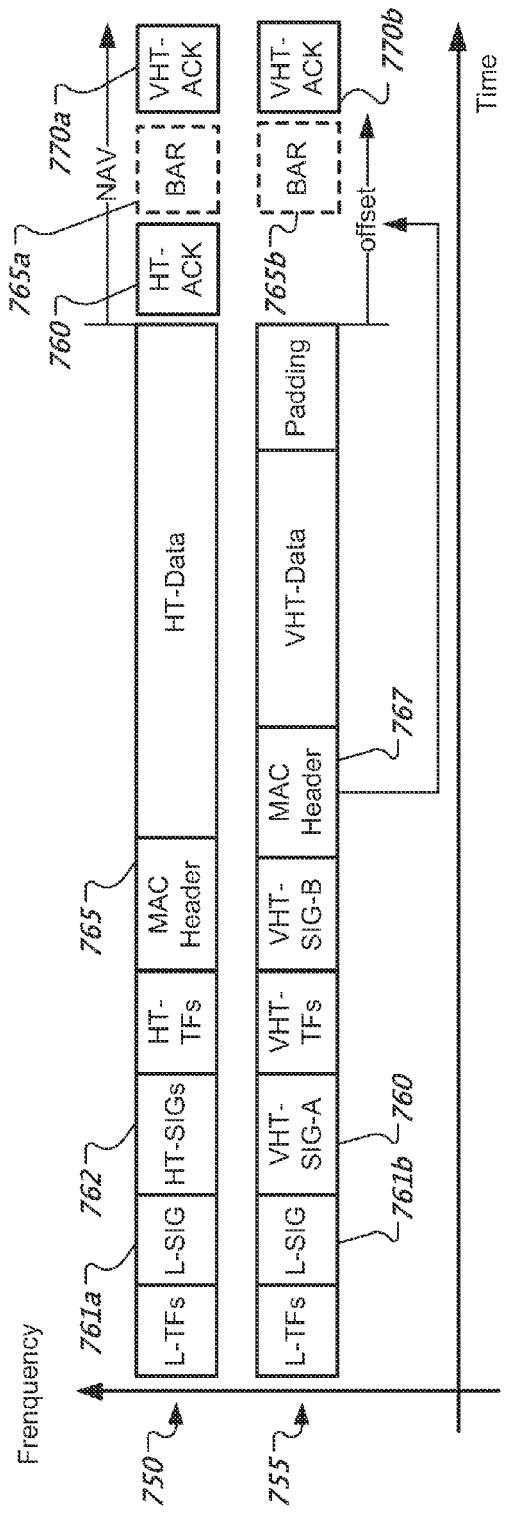

FIGS. 7A and 7B show examples of communication flow layouts, including acknowledgement responses, based on Orthogonal Frequency-Division Multiple Access (OFDMA).

Figure 8:
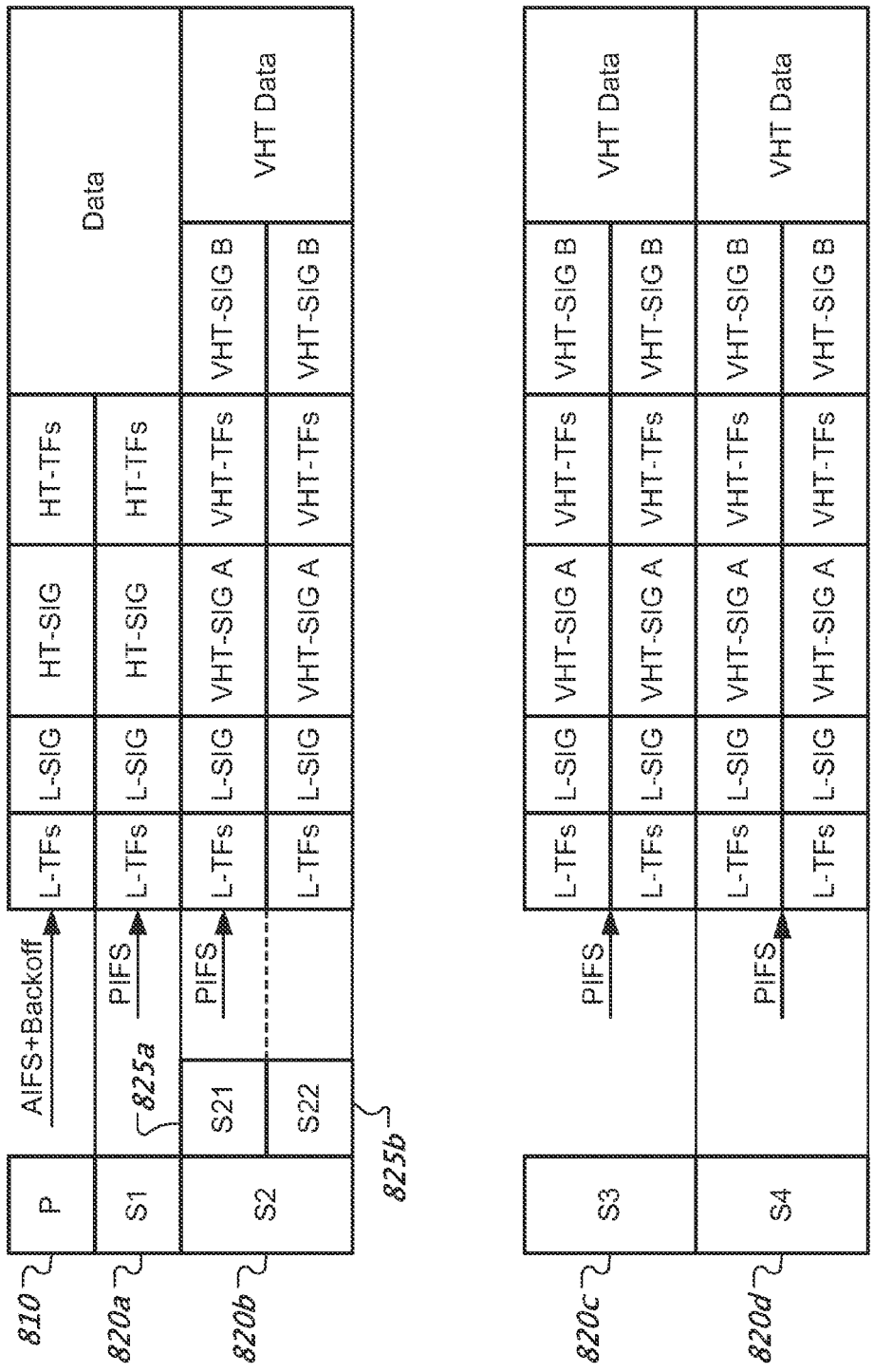

FIG. 8 shows an example of a communication flow layout for a primary channel and four secondary channels.

Figure 9:
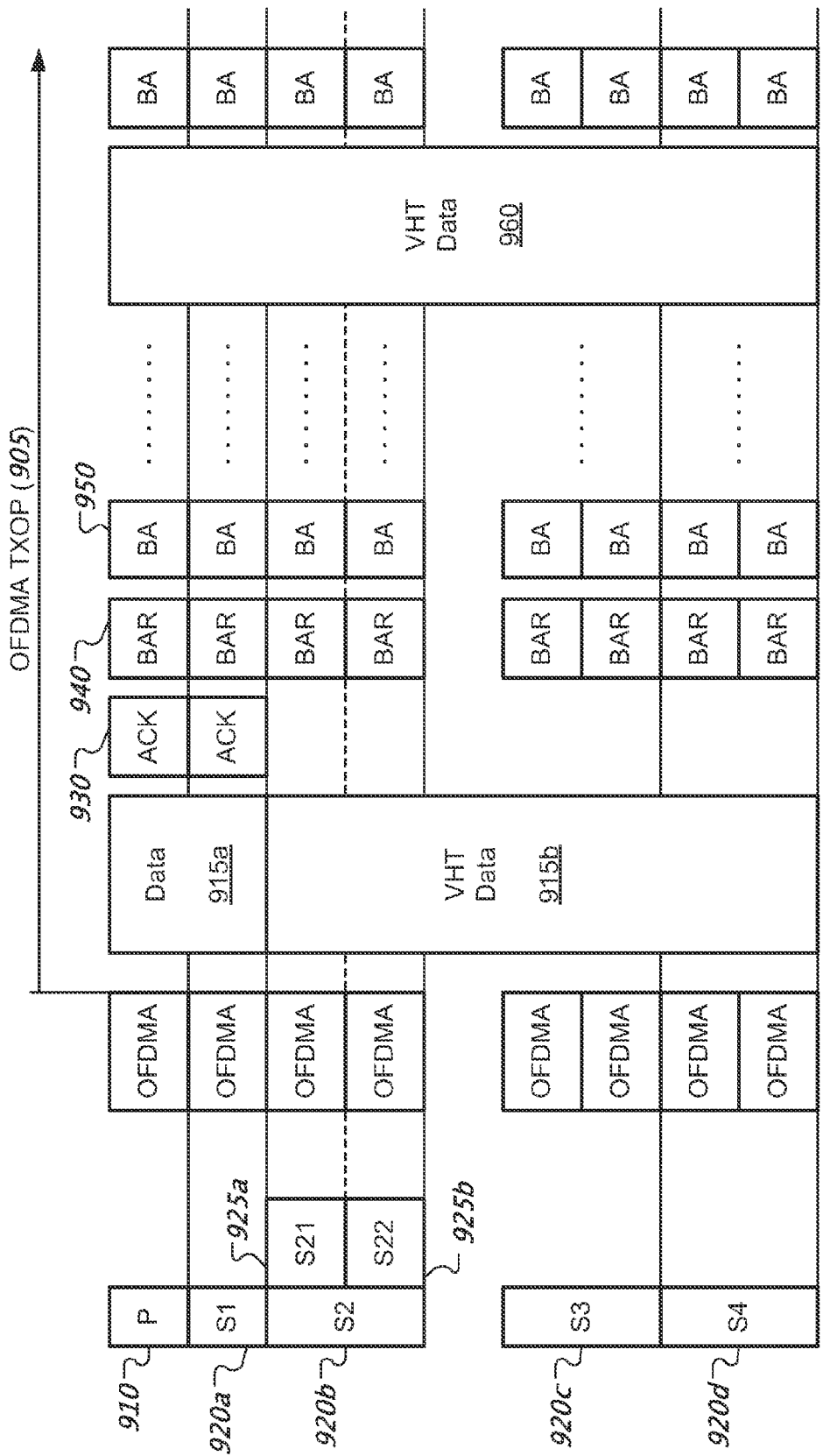
Figure 10:
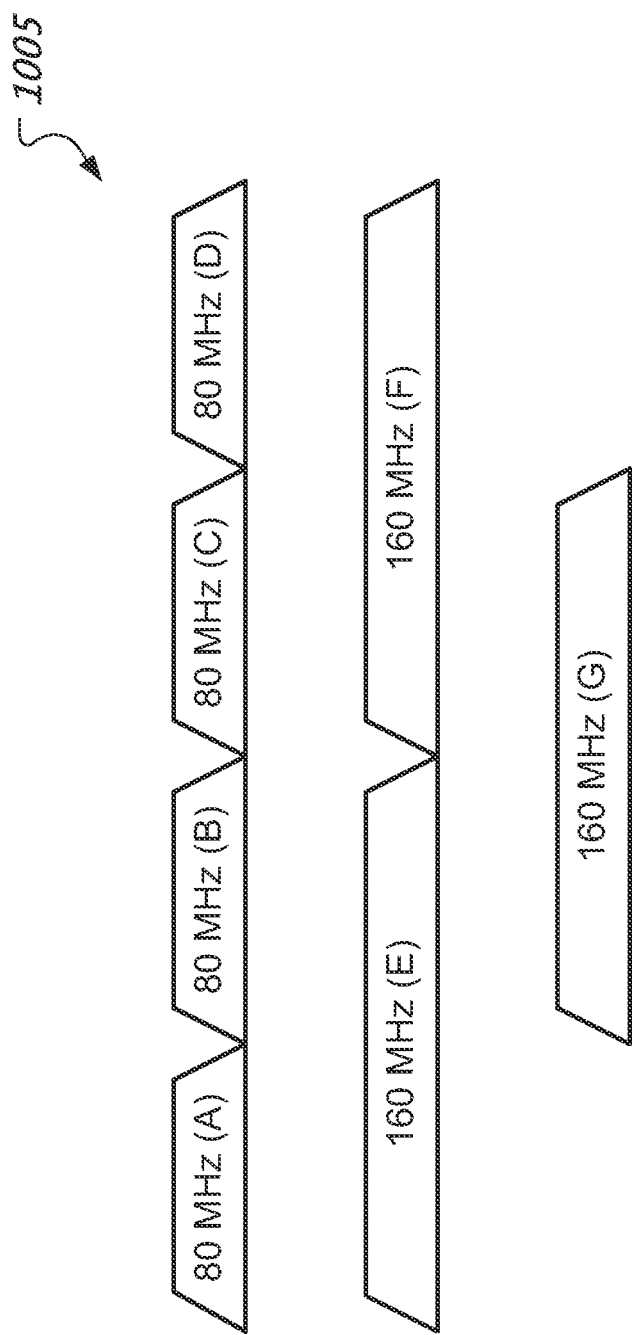

FIG. 9 shows an example of a dual-primary channel structure architecture,

FIG. 10 shows an example of a layout of overlapping channelizations.

Like reference symbols in the various drawings indicate like elements.

DETAILED DESCRIPTION

This disclosure provides details and examples of technologies for wireless local area networks, including systems and techniques for multi-channel wireless communications. An example of a technique for multi-channel device wireless communications includes operating a wireless communication device to communicate with two or more different types of wireless communication devices in a way that increases bandwidth utilization. Potential advantages include an increased utilization of primary and secondary channel bandwidth, backwards compatibility with older standards, or both. The techniques and architectures presented herein can be implemented in a variety of wireless communication systems such as ones based on IEEE 802.11ac.

Figure 1:
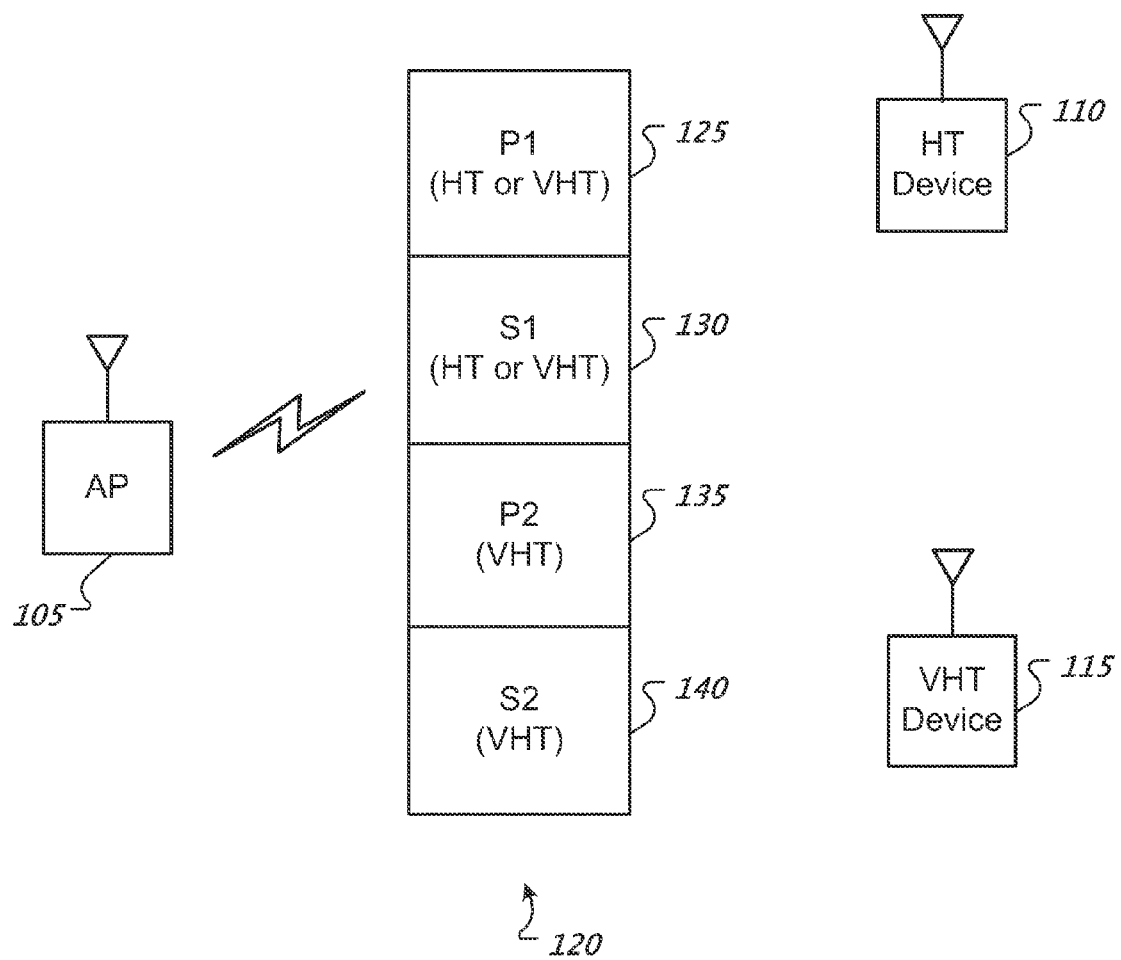
FIG. 1 shows an example of a channel structure for wireless communications.

FIG. 1 shows an example of a channel structure for wireless communications. Wireless communication devices 105, 110, 115 can communicate over a group 120 of channels 125, 130, 135, 140, which can each be 20 megahertz (MHz) wide, The group 120 can be in an 80 MHz overlapping basic service set (OBSS) configuration. The group 120 includes two primary channels 125, 135 (referred to as P1 and P2, respectively) and associated secondary channels 130, 140 (referred to as P1 and P2, respectively).

A transmission on the P1 channel 125 sets a transmission protection period such as a network allocation vector (NAV) on channels associated with the group 120. An AP device 105 can communicate with different types of devices (e.g., devices based on different standards) such as a high-throughout (HT) device 110 (e.g., IEEE 802.11n based device) and a very high-throughout (VHT) device 115 (e.g., IEEE 802.11ac based device). A HT device 110 is configured to use the P1 channel 125, the S1 channel 130, or a combination of these, whereas the VHT device 115 is configured to use the P1 channel 125, the P2 channel 135, the S1 channel 130, the S2 channel 140, or a combination of two or more of these channels. The AP can concurrently transmit to the VHT device 115 and the HT device 110.

In some cases, an AP device 105 transmits to the VHT device 115 using a P2 channel 135 and transmits to the HT device 110 using a P1 channel 125. The AP device 105 coordinates the transmission of one or more packets on the P1 and P2 channels 125, 135 such that they end at the same time to create a window for acknowledgements (ACKs). Moreover, an AP device 105 can use the P1 channel 125 and the S1 channel 130 to provide a 40 MHz wide transmission to a HT device 110 and use the P2 channel 135 and the S2 channel 140 to provide a 40 MHz wide transmission to a VHT device 115. In some cases, the AP can use all of the channels of the group 120 to communicate with a single device.

Figure 2:
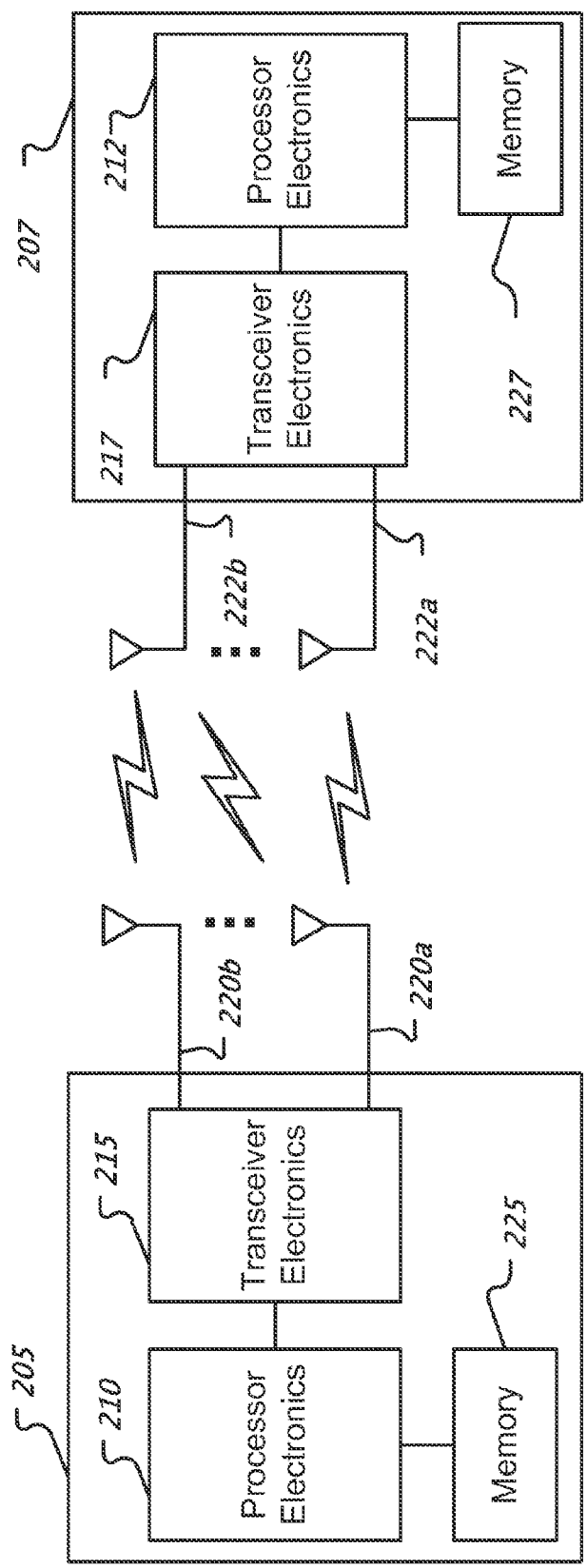
FIG. 2 shows an example of a wireless network with two wireless communication devices.

FIG. 2 shows an example of a wireless network with two wireless communication devices. Wireless communication devices 205, 207 such as an access point (AP), base station (BS), wireless headset, access terminal (AT), client station, or mobile station (MS) can include circuitry such as processor electronics 210, 212. Processor electronics 210, 212 can include one or more processors that implement one or more techniques presented in this disclosure. Wireless communication devices 205, 207 include circuitry such as transceiver electronics 215, 217 to send and receive wireless signals over one or more antennas 220a, 220b, 222a, 222b. In some implementations, transceiver electronics 215, 217 include integrated transmitting and receiving circuitry. In some implementations, transceiver electronics 215, 217 include multiple radio units. In some implementations, a radio unit includes a baseband unit (BBU) and a radio frequency unit (RFU) to transmit and receive signals. Transceiver electronics 215, 217 can include one or more of: detector, decoder, modulator, and encoder. Transceiver electronics 215, 217 can include one or more analog circuits. Wireless communication devices 205, 207 include one or more memories 225, 227 configured to store information such as data, instructions, or both. In some implementations, wireless communication devices 205, 207 include dedicated circuitry for transmitting and dedicated circuitry for receiving. In some implementations, a wireless communication device 205, 207 is operable to act as a serving device (e.g., an access point), or a client device.

In some implementations, a first wireless communication device 205 can transmit data to one or more devices via two or more spatial wireless communication channels such as orthogonal spatial subspaces, e.g., orthogonal Space Division Multiple Access (SDMA) subspaces. For example, the first wireless communication device 205 can concurrently transmit data to a second wireless communication device 207 using a spatial wireless channel and can transmit data to a third wireless communication device (not shown) using a different spatial wireless channel. In some implementations, the first wireless communication device 205 implements a space division technique to transmit data to two or more wireless communication devices using two or more spatial multiplexing matrices to provide spatially separated wireless channels in a single frequency range.

Wireless communication devices, such as a MIMO enabled access point, can transmit signals for multiple client wireless communication devices at the same time in the same frequency range by applying one or more transmitter side beam forming matrices to spatially separate signals associated with different client wireless communication devices. Based on different signal patterns at the different antennas of the wireless communication devices, each client wireless communication device can discern its own signal. A MIMO enabled access point can participate in sounding to obtain channel state information for each of the client wireless communication devices. The access point can compute spatial multiplexing matrices, such as spatial steering matrices, based on the different channel state information to spatially separate signals to different client devices.

Figure 3:
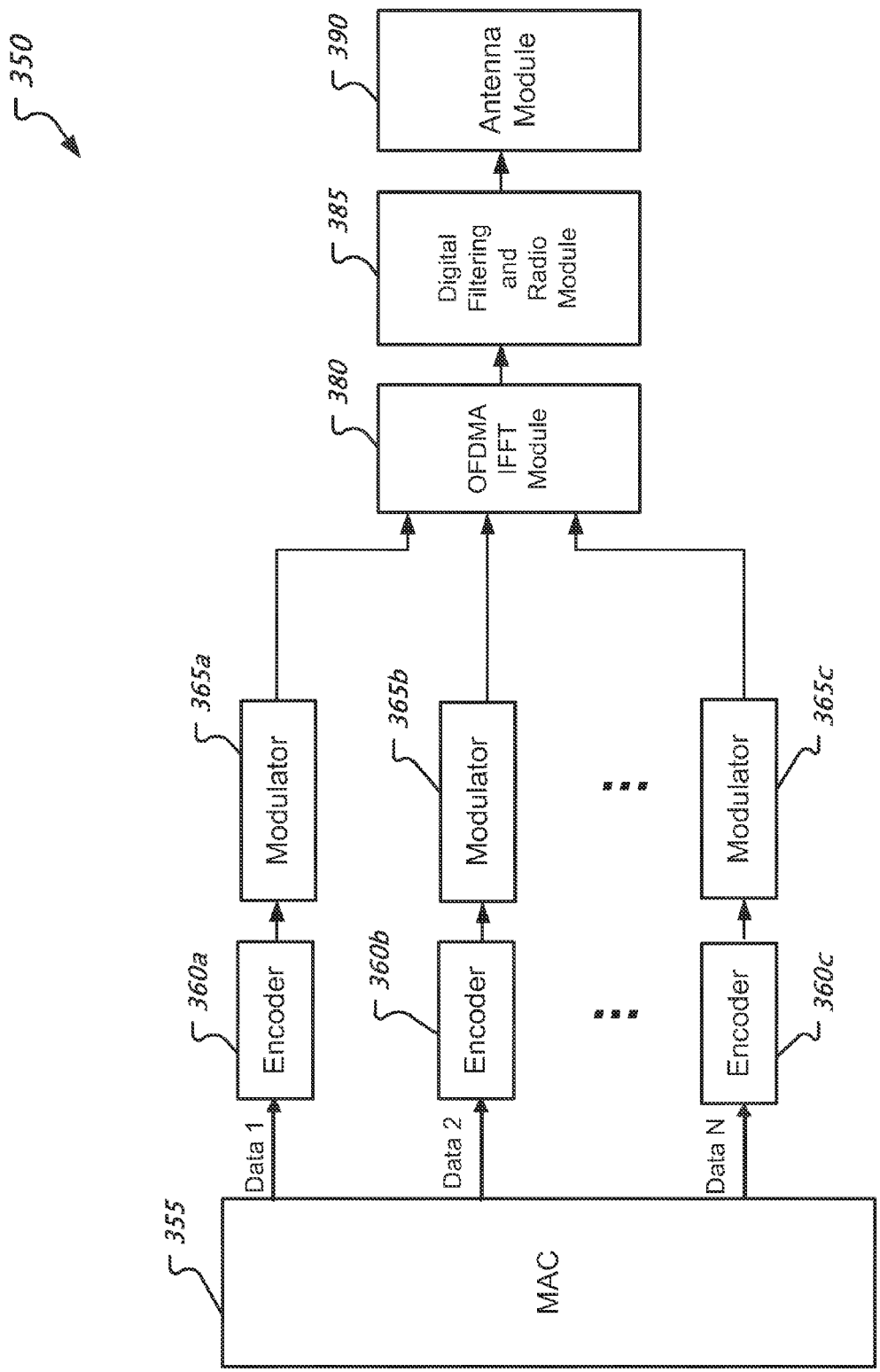
FIG. 3 shows an example of a wireless communication device architecture.

FIG. 3 shows an example of a wireless communication device architecture, which can include the various implementation details described above. A wireless communication device 350 can produce signals for two or more clients in two or more frequency ranges. Note that a channel can be associated with a frequency range. A frequency range can include a group of OFDM sub-carriers. The wireless communication device 350 includes a MAC module 355. The MAC module 355 can include one or more MAC control units (MCUs) (not shown). The wireless communication device 350 includes three or more encoders 360a, 360b, 360c that receive data streams, from the MAC module 355, which are associated with one or more clients (e.g., N clients, or N transmission streams to one or more clients). The encoders 360a, 360b, 360c can perform encoding, such as a forward error correction (FEC) encoding technique to produce respective encoded streams. Modulators 365a, 365b, 365c can perform modulation on respective encoded streams to produce modulated streams to an Orthogonal Frequency-Division Multiple Access (OFDMA) Inverse Fast Fourier Transform (IFFT) module 380.

The OFDMA IFFT (O-IFFT) module 380 can perform IFFTs on modulated streams from respective modulators 365a, 365b, 365c. In some implementations, the O-IFFT module 380 can include an OFDMA module and an IFFT module, where the OFDMA module maps different modulated streams to different subcarrier groups before IFFT processing. In some implementations, the O-IFFT module 380 can perform an IFFT on an output of the first modulator 365a to produce a first time domain signal associated with a first frequency range. The O-IFFT module 380 can perform an IFFT on an output of the second modulator 365b to produce a second time domain signal associated with a second frequency range. The O-IFFT module 380 can perform an IFFT on an output of the Nth modulator 365c to produce an Nth time domain signal associated with an Nth frequency range.

In some implementations, the O-IFFT module 380 can combine the frequency components, e.g., frequency range components, associated with the output of respective first modulators 365a, 365b, 365c. The O-IFFT module 380 can perform an IFFT on the combination to produce a time domain signal associated with the frequency ranges. In some implementations, an O-IFFT module 380 is configured to use one or more FFT bandwidth frequencies, e.g., 20 MHz, 40 MHz, 80 MHz, and 160 MHz. In some implementations, the O-IFFT module 380 can perform different IFFTs.

A digital filtering and radio module 385 can filter the time domain signal and amplify the signal for transmission via an antenna module 390. An antenna module 390 can include multiple transmit antennas and multiple receive antennas. In some implementations, an antenna module 390 is a detachable unit that is external to a wireless communication device 350.

In some implementations, a wireless communication device 350 includes one or more integrated circuits (ICs). In some implementations, a MAC module 355 includes one or more ICs. In some implementations, a wireless communication device 350 includes an IC that implements the functionality of multiple units and/or modules such as a MAC module, MCU, BBU, or RFU. In some implementations, a wireless communication device 350 includes a host processor that provides a data stream to a MAC module 355 for transmission. In some implementations, a wireless communication device 350 includes a host processor that receives a data stream from the MAC module 355, In some implementations, a host processor includes a MAC module 355.

Figure 4:
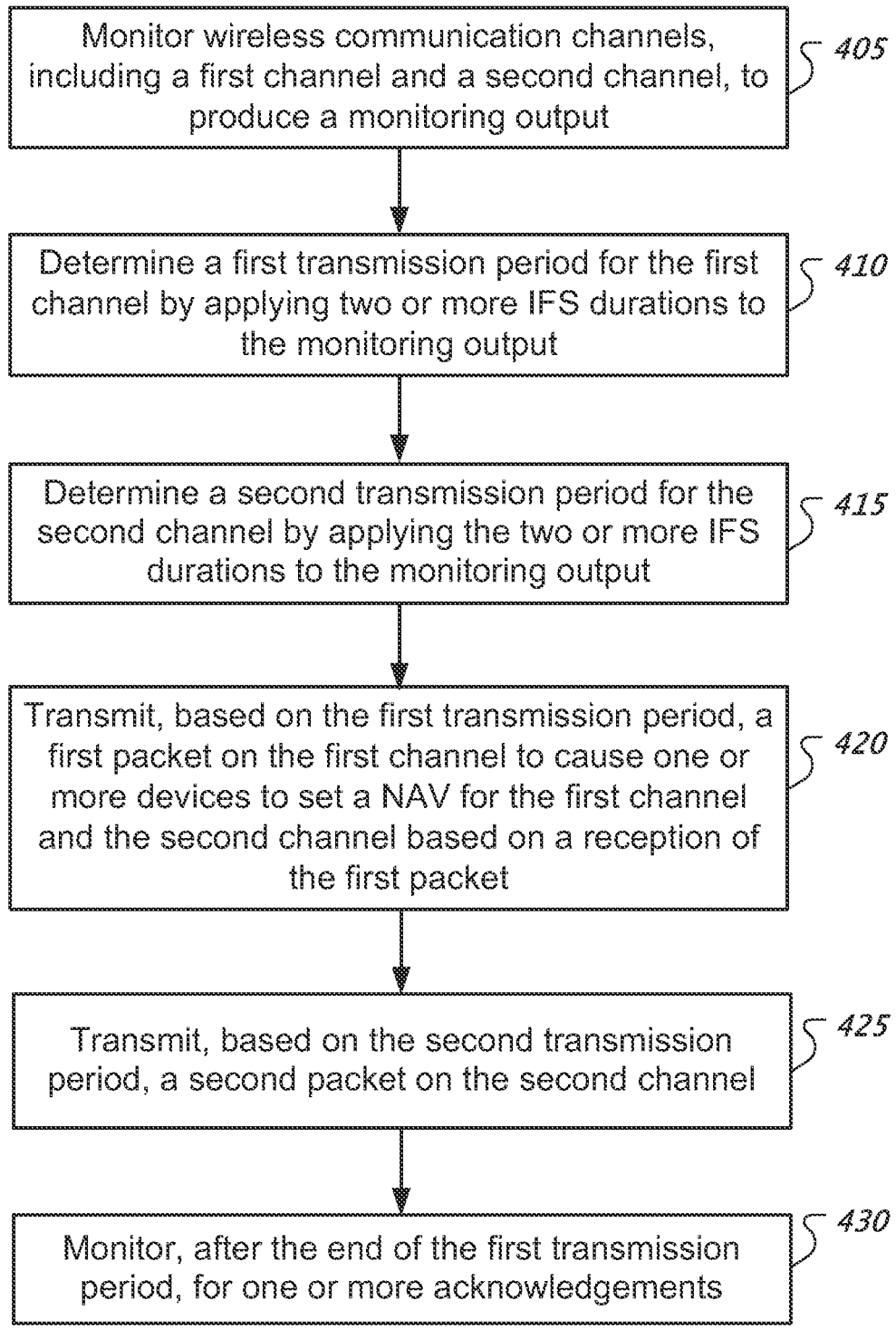
FIG. 4 shows an example of a communication process for multi-channel wireless communications.

FIG. 4 shows an example of a communication process for multi-channel wireless communications. At 405, a communication process monitors wireless communication channels, including a first channel and a second channel, to produce a monitoring output. The monitoring output can include a detection of traffic on a channel. At 410, the communication process determines a first transmission period for the first channel by applying two or more inter-packet durations, such as Interframe Space (IFS) durations, to the monitoring output. An IFS duration can control a duration between two sequential frame transmissions. A frame transmission can include a packet transmission. Another IFS duration can control a duration of a waiting period before a frame transmission. IFS durations can have different lengths. Various examples of IFS durations include an Arbitration IFS (AIFS) duration and a point coordination function (PCF) IFS (PIFS) duration. In some implementations, when the monitoring output indicates a presence of traffic on the first channel during a period based on the AIFS duration, the first transmission period can be determined by an end of a PIFS duration. A period based on the AIFS duration can include a back-off period. In some implementations, when the monitoring output indicates a presence of traffic on the first channel during a period based on the AIFS duration and a back-off period, a wireless device can freeze the back-off period until the first channel becomes idle again.

At 415, the communication process determines a second transmission period for the second channel by applying the two or more IFS durations to the monitoring output. Applying an IFS duration can include starting a timer, which is resettable based on a detection of traffic, When the monitoring output indicates a presence of traffic on the second channel during a period based on the AIFS duration, the second transmission period can be determined by an end of a PIFS duration. To control acknowledgement response(s), the end of the first transmission period can be aligned with the end of the second transmission period. Note that the starts of the first and second transmission periods can vary based on a previous detection of traffic. In some cases, the starts of the first and second transmission periods are the same. In some implementations, the communication process determines two or more transmission periods by applying two or more IFS durations to the monitoring output.

At 420, the communication process transmits, based on the first transmission period, a first packet on the first channel to cause one or more wireless communication devices to set a network allocation vector for the first channel and the second channel based on a reception of the first packet. At 425, the communication process transmits, based on the second transmission period, a second packet on the second channel. In some implementations, the communication process controls transmission circuitry to transmit a packet.

At 430, the communication process monitors, after the end of the first transmission period, for one or more acknowledgements, The process can include sending information that indicates a scheduling of acknowledgements for two or more devices.

In some cases, an access point can transmit packets to two devices for respective overlapping transmission periods. The two devices can be based on different respective wireless communication standards (e.g., IEEE 802.11n or IEEE: 802.11ac). For example, transmitting a first packet can include transmitting to a first wireless communication device that is configured for communications based on a first wireless communication standard (e.g., IEEE 802.11n), whereas, transmitting a second packet can include transmitting to a second wireless device that is configured for communications based on a second wireless communication standard (e.g., IEEE 802.11ac). Note that the first and the second wireless communication standards can define mutually compatible communications on the first channel, with the second standard defining communications for the first and second channels.

In some cases, an access point can have overlapping transmissions to the same device using multiple channels. For example, transmitting first and second packets can include transmitting the packets concurrently to the same device. These packets can form an aggregated packet that provides increased communication bandwidth.

Figure 5A:
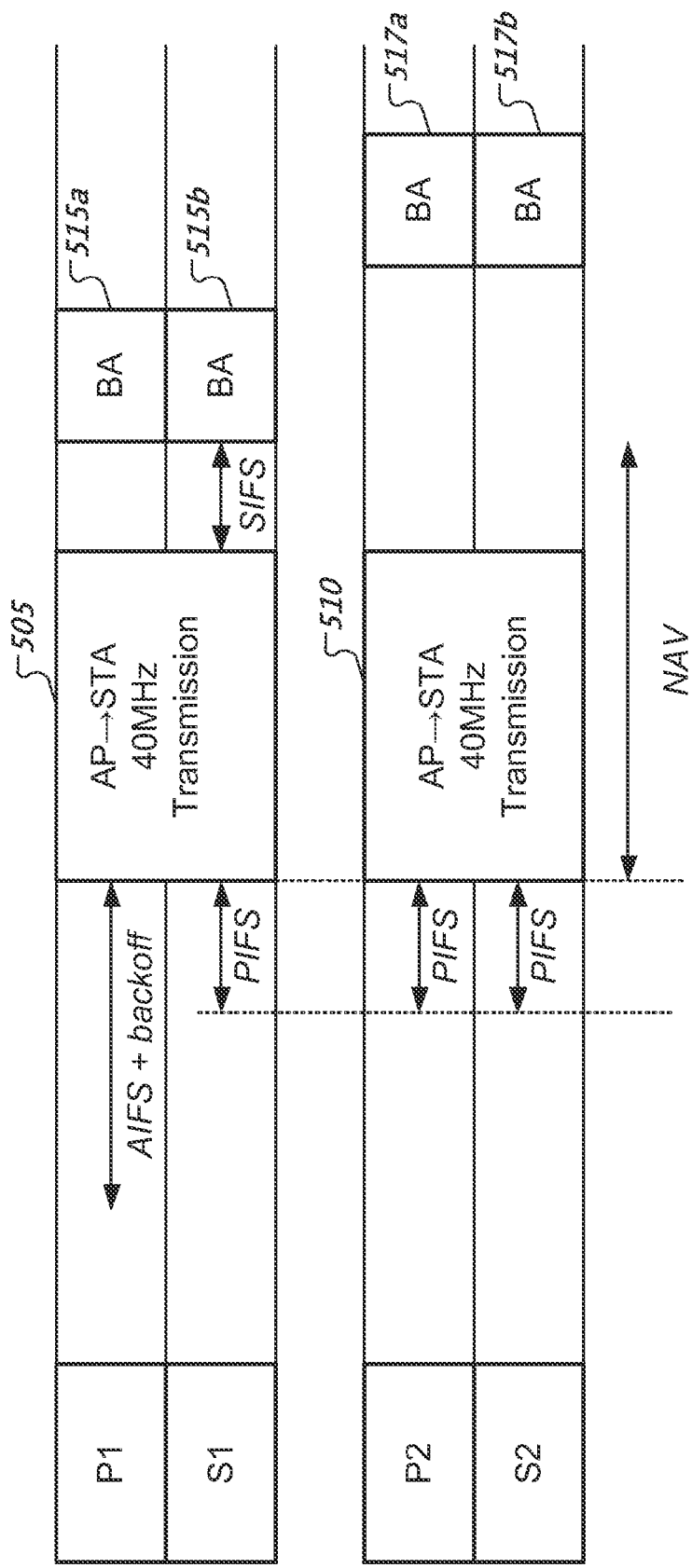

FIGS. 5A, 5B, 5C, and 5D show different examples of communication flows via multiple channels. These examples make use of primary channels P1 and P2 and secondary channels S1 and S2. Note that a transmission on a primary channel may include a concurrent transmission on a secondary channel, FIG. 5A shows an example of a communication flow that includes transmissions on multiple channels. To obtain a transmission opportunity (TXOP), a device such as an AP can monitor one or more primary channels and one or more secondary channels for wireless traffic, If a primary channel has been idled for an AIFS plus a back-off duration, and one or more secondary channels have been idle for at least a PIFS duration, the device can used the idle channels for the TXOP. Based on obtaining a TXOP, the device can send one or more frames continuously with a SIFS duration gap between the frames. In this example, based on a duration corresponding to an AIFS and a back-off parameter in the P1 channel and a duration of PIFS in the S1, P2, and S2 channels, an AP, in a TXOP, transmits a first packet 505 to a HT device on the P1 and S1 channels, and transmits a second packet 510 to a VHT device on the P2 and S2 channels. The transmissions of the first packet 505 and the second packet 510 run concurrently. In the presence of traffic on a channel, the AP can wait a duration corresponding to a PIFS before transmitting a packet. The reception of the first packet 505 on the P1 channel sets a Virtual NAV (VNAV) period for the P1 and P2 channels, and associated secondary channels, on a client device, A packet 505, 510 can include a data unit such as a Physical Layer Protocol Data Unit (PPDU). In some implementations, a packet 505, 510 can include multiple data units.

The AP device coordinates the transmission of the packets 505, 510 such that they end at the same time to create a window for acknowledgements (ACKs) such as a block acknowledgement (BA). Based on a duration corresponding to a Short Interframe Space (SIFS), the HT device can transmit one or more BAs 515a, 515b to the AP to acknowledge reception of the first packet 505. Based on the end of the transmission of the BAs 515a, 515b and another SIFS duration, the VHT device can transmit one or more BAs 517a, 517b to the AP to acknowledge reception of the second packet 510, In some implementations, the AP device sends block acknowledgement requests (BARs) to control the transmission of BAs from two or more devices.

The AP can use the P1 and P2 channels and associated secondary channels S1 and S2 to transmit data to one or more devices. In some cases, the AP can use the first packet 505 to transmit to a VHT device. Moreover, the AP can use the second packet 510 to transmit to the same or different VHT device.

Figure 5B:
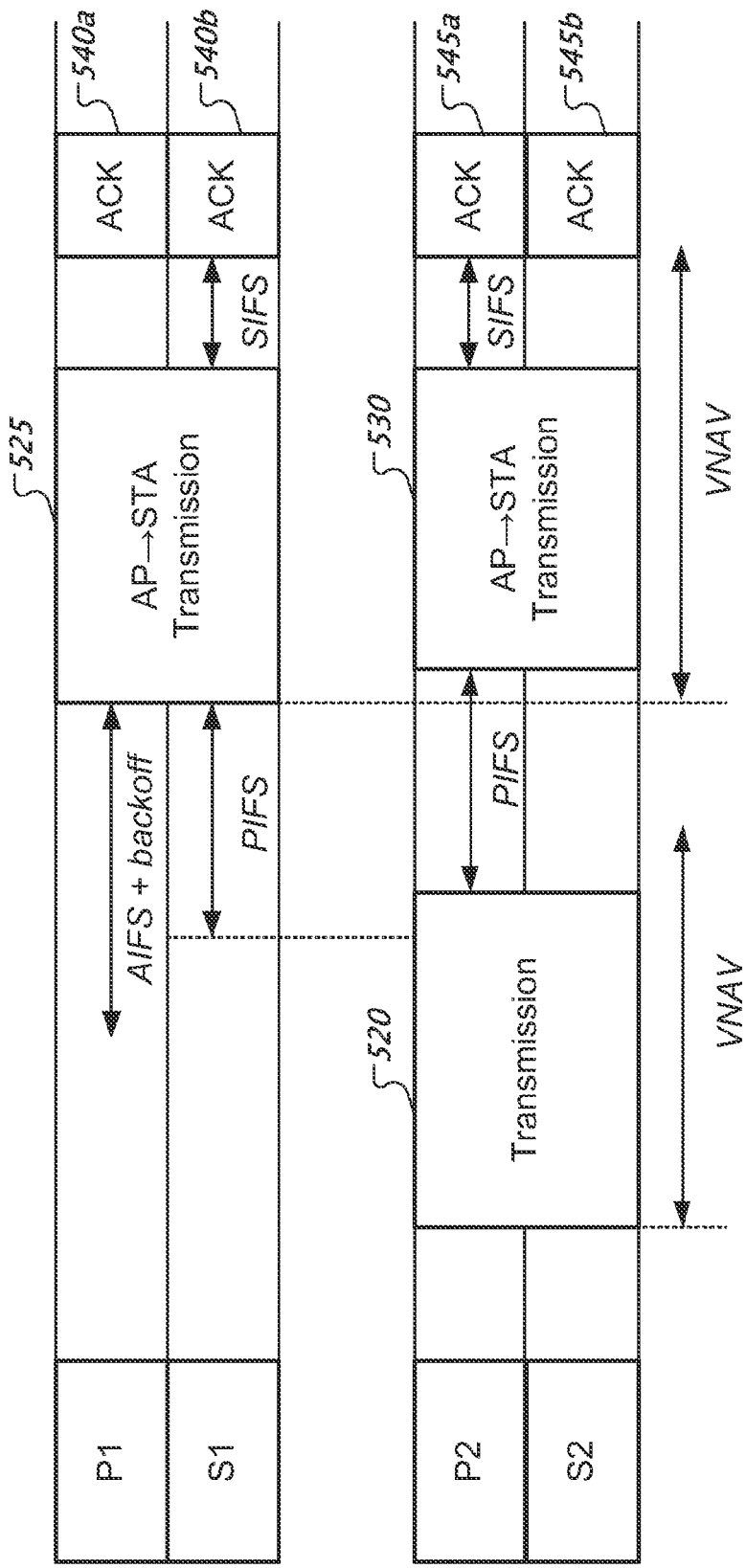

FIG. 5B shows another example of a communication flow that includes transmissions on multiple channels, In this example, receiving a transmission of a first packet 520 from a device on the P2 and S2 channels delays a transmission of data on the P2 and S2 channels. The transmission of a first packet 520 sets a NAV. Based on an end of the first packet 520 and a PIFS duration, the AP transmits a third packet 530 to a VHT device via the P2 and S2 channels. Based on an AIFS plus back-off duration, an AP transmits a second packet 525 to a HT device via the P1 and S1 channels. The second packet 525 can be indicative of a Clear To Send (CTS) message. For example, the second packet 525 can include a CTS-to-self. In this example, a portion of the transmissions of the second packet 525 and the third packet 530 overlap. The transmission of the second packet 525 on the P1 channel sets a VNAV period for the P1 and P2 channels and associated S1 and S2 channels.

The AP coordinates the transmission of the second packet 525 and third packet 530 such that they end at the same time to create a window for ACKs 540a, 540b from the HT device and ACKs 545a, 545b from the VHT device. The ACKs from the HT and VHT devices are allowed to overlap, albeit on different channels.

Figure 5C:
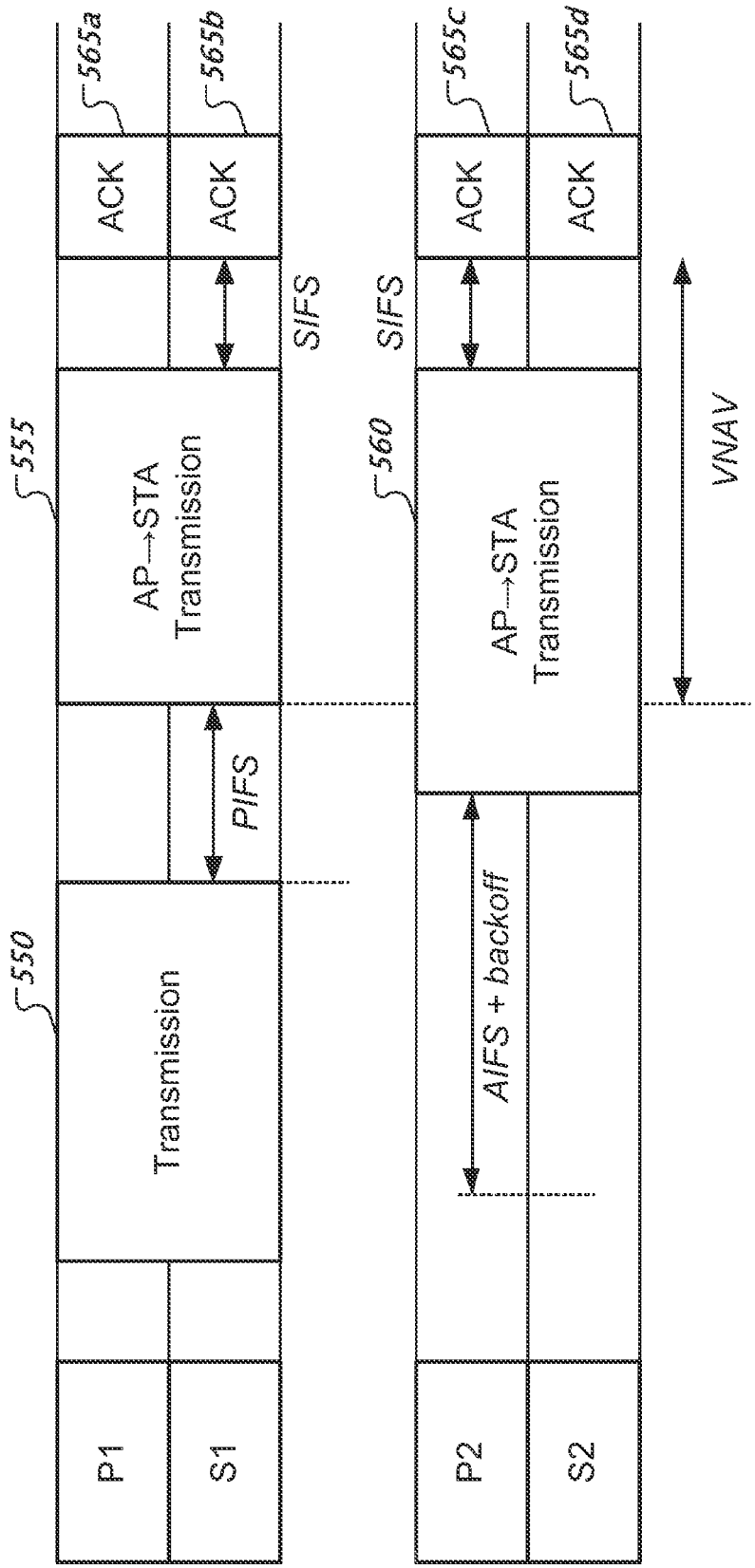

FIG. 5C shows another example of a communication flow that includes transmissions on multiple channels. In this example, receiving a transmission of a first packet 550 on P1 and S1 channels delays a transmission of data on the P1 channel. Based on the end of the transmission of the first packet 550 and a PIFS duration, the AP transmits a second packet 555 to a HT device via the P1 and S1 channels, In some cases, the second packet 555 can include a CTS-to-self instead of data for a device. The transmission of the second packet 555 on the P1 channel sets a transmission protection period such as a VNAV period for the P1 and P2 channels. The transmission of the second packet 555 prevents devices, which are listening, from transmitting on the P1 and S1 channels. Based on an AIFS plus back-off duration, the AP transmits a third packet 560 to a VHT device via the P2 and S2 channels. Note that the start of the third packet 560 is earlier than the second packet 555 due to the previous traffic.

The AP device coordinates the transmission of the second packet 555 and third packet 560 such that they end at the same time to create a window for ACKs 565a, 565b, 565c, 565d from the HT and VHT devices. In some implementations, the ACKs from the HT and VHT devices are allowed to overlap, albeit on different channels.

Figure 5D:
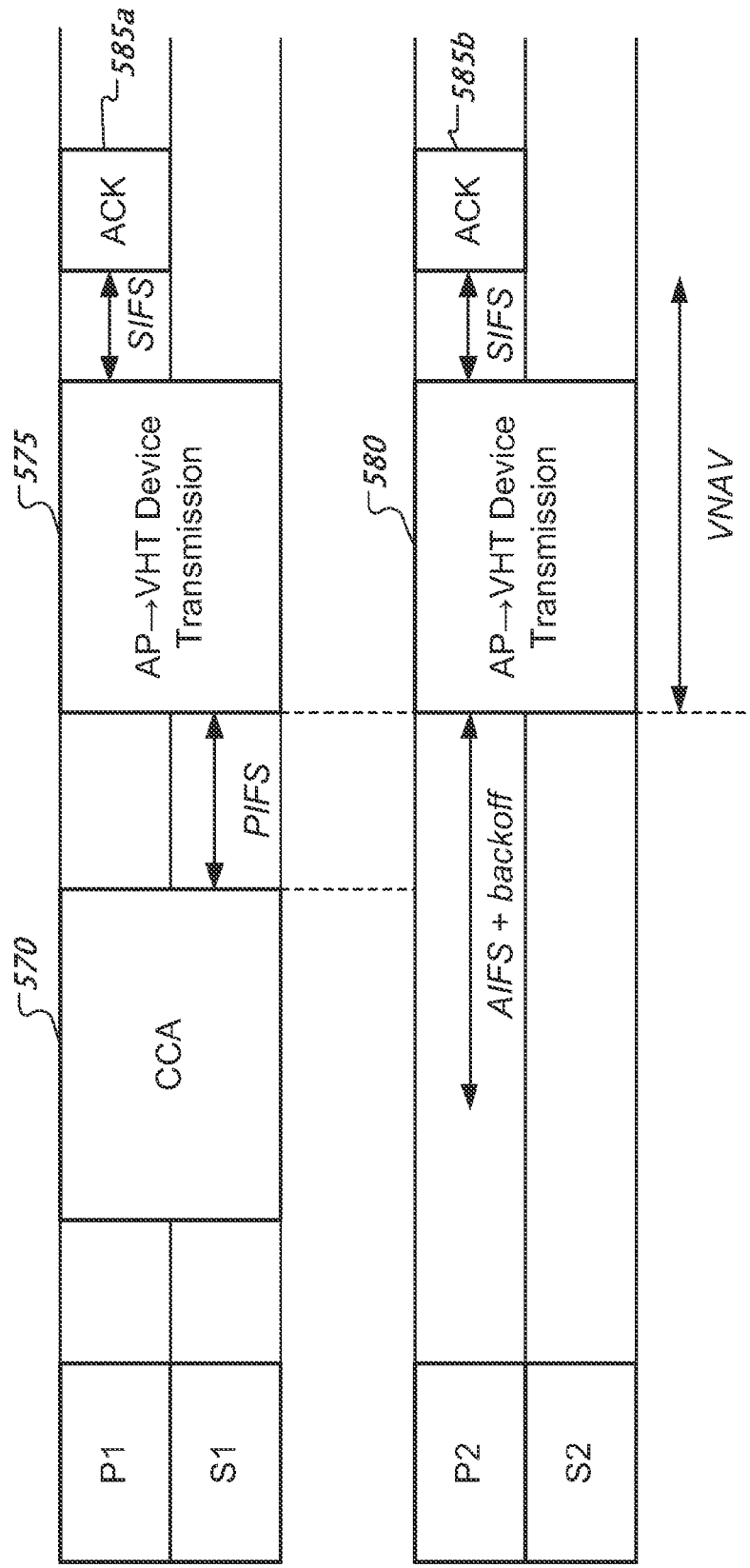

FIG. 5D shows another example of a communication flow that includes transmissions on multiple channels and a period for a clear channel assessment. In this example, an AP performs a Clear Channel Assessment (CCA), Based on an end of the CCA 570 and a PIFS duration, the AP transmits a first packet 575 to a HT device via the P1 and S1 channels, and transmits a second packet 580 to a VHT device via the P2 and S2 channels. The transmissions of the first packet 575 and the second packet 580 run concurrently. The transmission of the first packet 575 on the P1 channel sets a VNAV period for the P1 and P2 channels. The AP is not required to receive during the transmission of the first packet 575 on the P1 channel. The AP coordinates the transmission of the packets 575, 580 such that they end at the same time to create a window for acknowledgements 585a, 585b, FIG. 6 shows an example of a bandwidth indication for DL-OFDMA. An AP can announce support, for downlink OFDMA (DL-OFDMA). During an association period with an AP, a VHT device can indicate support for DL-OFDMA. The AP can send a bandwidth indication to indicate bandwidths for respective channels associated with DL-OFDMA. A bandwidth indication 605 includes bit values (B1-B4) for respective channels (C1-C4). Channels C1 and C2 can be grouped into a first segment and channels C3 and C4 into a second segment. Channel C1 can be deemed the primary channel and channels C2, C3 and C4 as secondary channels. A combination of the bit values can indicate bandwidths for respective segments. Note that the bandwidth for the first segment can be different than the bandwidth for the second segment, In some bit value combinations, no bandwidth is indicated.

With respect to the following figures, transmission signals can include one or more legacy training fields (L-TFs) such as a Legacy Short Training Field (L-STF) or Legacy-Long Training Field (L-LTF). Transmission signals can include one or more Legacy Signal Fields (L-SIGs). Transmission signals can include one or more HT Signal Fields (HT-SIGs). Transmission signals can include one or more HT training fields (HT-TFs). Examples of such training fields include a HT Short, Training Field (HT-STF) and a HT Long Training Field (HT-LTF). Transmission signals can include one or more VHT Signal Fields (VHT-SIGs). Transmission signals can include one or more HT training fields (VHT-TFs). Examples of such training fields include a VHT Short, Training Field (VHT-STF) and a VHT Long Training Field (VHT-LTF). Transmission signals can include different types of data fields such as HT-Data fields and VHT-Data fields, A packet that is indicated by a transmission can include training fields, signal fields, and a data component, e.g., VHT data or HT data.

FIGS. 7A and 7B show examples of communication flow layouts, including acknowledgement responses, based on Orthogonal Frequency-Division Multiple Access (OFDMA), In these examples, an AP concurrently transmits HT data and VHT data, An AP can communicate with devices such as HT devices and VHT devices.

FIG. 7A shows an example of a communication flow layout that includes concurrent acknowledgement responses. An AP can use a primary channel to transmit to a HT device and a secondary channel to transmit to a VHT device. A HT transmission 705 can be 20 MHz or 40 MHz wide. A VHT transmission 710 can be 40, 80, 120, or 160 MHz wide. A bandwidth field in a VHT-SIG-A. 715 can indicate a bandwidth of the VHT transmission 710. In some implementations, a length field of the VHT-SIG-A 715 indicates the bandwidth, If required, the AP can include padding 730 to align an end of the VHT transmission 710 with an end of the HT transmission 705. A VHT device can use an identifier such as a device identifier or a group identifier to determine whether the VHT transmission 710 is intended for itself. The HT device responds with a HT-ACK 720 on the primary channel, whereas the VHT device responds, concurrently, with a VHT-ACK 725 on the secondary channel.

FIG. 7B shows an example of a communication flow layout that includes sequential acknowledgement responses. An AP can use a primary channel to transmit to a HT device and a secondary channel to transmit to a VHT device. An HT transmission 750 can be 20 MHz or 40 MHz wide. A VHT transmission 755 can be 40, 80, 120, or 160 MHz wide. A bandwidth field in a VHT-SIG-A 760 can indicate a bandwidth of the VHT transmission 755. A duration value in a MAC header 765 of the HT transmission 750 indicates an end of a period (e.g., end of NAV) for acknowledgement(s) to the HT transmission 750 and the VHT transmission 755. An offset value in a MAC header 767 of the VHT transmission 755 indicates an offset value for a VHT device. The VHT device uses the offset value to base a transmission of one or more VHT-ACKs 770a, 770b so as to not overlap with the HT-ACK 760. In this example, the HT-ACK 760 is only transmitted in a single subchannel, e.g., a 20 or 40 MHz subchannel. The BARs 765a, 765b and the VHT-ACKs 770a, 770b are transmitted based on a duplication mode that replicates a response in multiple subchannels.

A VHT device can detect downlink OFDMA transmissions by processing a received signal. For example, a length field (e.g., L_LENGTH) in a L-SIG 761a, 761b can be used to signal a downlink OFDMA transmission to a VHT device. Downlink OFDMA signaling via the length field can be backwards compatible with IEEE 802.11n. In IEEE 802.11n, L_LENGTH is defined as $$L\_LENGTH = \left\lceil \frac{TXTIME - Signal\_Extension - 20}{4} \right\rceil \times 3 - 3$$

where TXTIME represents a transmission time and signal extension represents a signal extension value. It is noted that this L_LENGTH modulo three equals zero.

For a VHT device participating in a downlink OFDMA transmission, L_LENGTH can be defined as $$L\_LENGTH = \left\lceil \frac{TXTIME - Signal\_Extension - 20}{4} \right\rceil \times 3 - 2.$$

It is noted that this L_LENGTH modulo three equals one. In some implementations, L_LENGTH can be defined as $$L\_LENGTH = \left\lceil \frac{TXTIME - Signal\_Extension - 20}{4} \right\rceil \times 3 - 1$$

to indicate a downlink OFDMA transmission, A VHT device receiving a L-SIG that indicates a IEEE 802.11n transmission (e.g., a rate of 6 Mbps) and a L_LENGTH condition that indicate a downlink OFDMA transmission. In some implementations, a L_LENGTH condition is when the L_LENGTH value modulo three equals one. In some implementations, the L_LENGTH condition is when the L_LENGTH value modulo three does not equal zero.

To process received transmission 750, 755, a VHT device can perform a FFT based on a bandwidth of 20, 40, 80, or 160 MHz. Based on a rotation on the first and second symbol of a HT-SIG 762 and a VHT-SIG-A 760, a transmission on a primary channel can be identified as a HT transmission 750 and a transmission on one or more secondary channels can be identified as a VHT transmission 755. The VHT device can use tones associated with the VHT transmission 755 to determine the received VHT-SIG-A 760 information and determine a channel bandwidth. The VHT device processes a received PPDU based on VHT-SIG information.

FIG. 8 shows an example of a communication flow layout for a primary channel and four secondary channels. An AP can communicate with client devices via a primary channel, P channel 810, and secondary channels, S1 channel 820a, S2 channel 820b, S3 channel 820c, and S4 channel 820d. A 40 MHz wide secondary channel 820b can be split into two 20 MHz wide subchannels 825a, 825b (labeled S21 and S22). Based on detecting a DL-OFDMA transmission (e.g., detecting such a transmission via an indication in L-TF(s), L-SIG(s), or a prior packet), a VHT device starts to check the S21 subchannel 825a for VHT packets. In some implementations, the VHT device checks the S22 subchannel 825b for VHT packets. In some implementations, the VHT device checks a combination of subchannels 825a, 825b.

An AP can include information in its transmissions to differentiate an IEEE 802.11ac based downlink OFDMA transmission from other transmissions such as an IEEE 802.11a transmission, an IEEE 802.11n transmission, or an IEEE 802.11ac transmission to a single device. For an OFDMA packet, a receiving VHT device checks the channels carrying a VHT frame, whereas HT devices check the P, S1, or both channels for a HT frame. For example, a L-SIG with {rate=6 Mbps, and L_LENGTH % 3≠0} in the P channel 810 and a L-SIG with {rate=6 Mbps, and L_LENGTH % 3≠0} in the S21 channel 825a can be used to indicate a DL-OFDMA transmission.

In some cases, a VHT device may decode a L-SIG in the P channel 810. A L-SIG with {rate=6 Mbps, and L_LENGTH % 3≠0} can indicate a DL-OFDMA transmission. If a non-HT PPDU uses {rate=6 Mbps, and L_LENGTH % 3≠0}, a DL-OFDMA capable VHT device can store and check the following two symbols in the P channel 810 and the S21 channel 825a to determine whether a received transmission includes a single non-HT packet or a DL-OFDMA transmission, If a VHT device detects signaling information such as a L-STF, L-LTF, or L-SIG in the P channel 810 and the S21 channel 825a at around the same time, the VHT device can then check S21 channel 825a for a L-SIG and a VHT-SIG-A, If present, the L-SIG, VHT-SIG-A, or both can indicate whether the received transmission is a non-OFDMA frame (e.g., a frame containing a packet for a single device) or a DL-OFDMA frame (e.g., a frame containing separate data for two or more devices). In some implementations, when transmitting L-SIG on I-rail, a low power signal transmitted on an unused Q-rail (e.g., at 6 dB lower than the power on I-rail) can be used to indicate a DL-OFDMA transmission. After a VHT device detects an OFDMA frame, the VHT device checks the VHT-SIG field in the S21 channel to determine the channels carrying the VHT frame and the associated channel bandwidths.

FIG. 9 shows an example of a dual-primary channel structure architecture, An AP can communicate with client devices via a primary channel (e.g., P channel 910) and one or more secondary channels (e.g., S1 channel 920a, S2 channel 920b, S3 channel 920c, and S4 channel 920d). The P channel 910 can be 20 MHz wide. A secondary channel 920a that is adjacent to the P channel 910 can be 20 MHz wide. Other secondary channels 920b, c, d can be 40 MHz wide. A 40 MHz wide secondary channel 920b can be split into two 20 MHz wide channels 925a, 925b (labeled S21 and S22), one of which can be deemed a primary.

the AP reserves a transmission opportunity (TXOP) period 905 for DL-OFDMA transmission by using an OFDMA control frame. The OFDMA control frame indicates that the following TXOP is an OFDMA TXOP. In an OFDMA TXOP, HT devices and IEEE 802.11a based devices can monitor the P channel 910 for channel activities, whereas VHT devices can monitor the S21 channel 925a for channel activities. The presence of a VHT-SIG-A in the S21 channel 925a can indicate a transmission type (e.g., a DL-OFDMA transmission type or a non-OFDMA transmission type) and subchannel usage. VHT-SIGs such as VHT-SIG-A or VHT-SIG-B can include OFDMA bandwidth usage for one or more VHT devices. For example, a VHT-SIG can include an OFDMA group identifier and bandwidth information such as bandwidth allocation values for one or more group members. Based on such bandwidth information and the OFDMA group identifier, a VHT device can prepare to receive a transmission on the S21 and S22 channels, or, if otherwise indicated, on all of the channels.

The AP can concurrently transmit a first transmission 915a to a non-VHT device and second transmission 915b to a VHT device. A non-VHT device such as a HT device or an IEEE 802.11a based device can send an ACK 930 following a data transmission 915a, whereas a VHT device can send an acknowledgement such as a BA 950 following a transmission of a BAR 940 that is subsequent to the ACK. 930 from the non-VHT device. In the future, the AP can use the P channel 910 and all of the secondary channels 920a-d to transmit VHT Data 960 to a VHT device.

Wireless communication devices can provide CCA on a primary channel (e.g., P channel 910) and associated secondary channels (e.g., S1-S4 channels 920a-d). In some implementations, a receiver of a VHT device with an operating channel width set to 80/160 MHz can provide CCA on both the primary and the secondary channels. When the secondary channels are idle, the start of a valid 20 MHz HT/VHT signal in the primary channel at a receive level equal to or greater than the minimum modulation and coding rate sensitivity of −82 dBm can cause the PHY to set a PHY CCA BUSY status for the primary channel with a probability of greater than 90% within four seconds.

The start of a valid 40 MHz HT or 40 MHz VHT signal that occupies both the primary channel and the first secondary channel at a receive level equal to or greater than the minimum modulation and coding rate sensitivity of −79 dBm can cause the PHY to set a PHY CCA BUSY status for both the primary channel and the first secondary channel with a per channel probability of greater than 90% within four seconds.

The start of a valid 80 MHz VHT signal that occupies both the primary channel and some or all of the secondary channels at a receive level equal to or greater than the minimum modulation and coding rate sensitivity of −76 dBm can cause the PHY to set PHY CCA BUSY status for both the primary channel and the first and second secondary channel with a per channel probability of greater than 90% within four seconds. Other values for the minimum modulation and coding rate sensitivity are possible for different bandwidth configurations (e.g., −73 dBm for a 120 MHz VHT signal, and −70 dBm for a 160 MHz VHT signal).

The receiver can hold a 20 MHz primary channel CCA signal busy for a signal at or above a predetermined threshold value (e.g., −62 dBm) in the 20 MHz primary channel. This receive level is 20 dB above the minimum modulation and coding rate sensitivity for a 20 MHz PPDU. When the primary channel is idle, the receiver can hold the 20 MHz secondary channel CCA signal busy for a signal at or above the predetermined threshold value in the 20 MHz secondary channel. In some implementations, when the primary channel is idle, the receiver can hold a 40 MHz secondary channel CCA signal busy for a signal at or above the predetermined threshold value in a 20 MHz subchannel of the 40 MHz secondary channel. In some implementations, when the primary channel is idle, the receiver can hold a 80 MHz secondary channel CCA signal busy for any signal at or above the predetermined threshold value in a 20 MHz subchannel of the 80 MHz secondary channel.

The receiver can hold the 20 MHz primary channel CCA and one or more secondary channels CCA busy for a signal present in the primary and one or more secondary channels that is at or above the predetermined threshold value in the primary channel and at or above the predetermined threshold value in the one or more secondary channels. The receiver can hold the 20 MHz primary channel CCA signal busy for any signal at or above the predetermined threshold value in the 20 MHz primary channel. This level is 20 dB above the minimum modulation and coding rate sensitivity for a 20 MHz PPDU. When the primary channel is idle, the receiver can hold the 20 MHz secondary channel CCA signal busy for a signal at or above the predetermined threshold value in the 20 MHz secondary channel. When the primary channel is idle, the receiver can hold a 40/80 MHz secondary channel CCA signal busy for a signal at or above the predetermined threshold value in a 20 MHz subchannel of the 40/80 MHz secondary channel. The receiver can hold the 20 MHz primary channel CCA and one or more secondary channels CCA busy for a signal present in the primary and the secondary channel(s) that is at or above the predetermined threshold value in the primary channel and at or above the predetermined threshold value in the secondary channel(s).

A receiver that does not support the reception of HT-GF format PPDUs can hold the CCA signal busy (e.g., set a PHY CCA BUSY status) for a valid HT-GF signal in the primary channel at a receive level equal to or greater than −72 dBm when the first secondary channel is idle. A receiver that does not support the reception of HT-GF format PPDUs can hold the 20 MHz primary channel CCA and the 20 MHz secondary channel CCA busy (e.g., set a PHY CCA BUSY status) for a valid 40 MHz HT-GF signal in the primary and the first secondary channels at a receive level equal to or greater than −69 dBm. A receiver that does not support the reception of HT-GF format PPDUs can hold the CCA signal busy for a valid HT-GF signal in the primary channel at a receive level equal to or greater than −72 dBm when the first secondary channel is idle. A receiver that does not support the reception of HT-GF format PPDUs can hold both the 20 MHz primary channel CCA and the 20 MHz secondary channel CCA busy for any valid 40 MHz HT-GF signal in both the primary and the first secondary channel at a receive level equal to or greater than −69 dBm.

FIG. 10 shows an example of a layout of overlapping channelizations. A layout 1005 of channels used by one or more wireless communication systems can include 80 MHz wide-band channels (e.g., channels A, B, C, and D) and 160 MHz wide-band channels (e.g., channels E, F, and G). The 80 MHz wide channels do not overlap with each other. Channel E overlaps with channels A and B. Channel F overlaps with channels C and D. Channel G overlaps with channel E and F. A 80 MHz wide-band channel can include one 20 MHz primary subchannel and multiple secondary subchannels. A 160 MHz wide-band channel can include one 20 MHz primary subchannel and multiple secondary subchannels. Beacons are transmitted in the primary subchannel. When an AP establishes a BSS, the AP can be required not to use an OBSS's secondary channel as the AP's primary channel. When an AP establishes a BSS, the AP can be required not to use an OBSS's primary channel or a 20 MHz only channel as the AP's secondary channel.

If an OBSS is present in channel E and channel F, and their associated primary channels fall into channel G, a new BSS may not be established in channel G. However, the AP controlling the BSS associated with G may select one of the OBSS's primary channels as its own primary channel. The AP of BSS G can access the secondary channel corresponding to the other primary channel(s) only after the AP's own primary channel is idle for a duration of AIFS plus backoff and the corresponding secondary channel is idle for at least the same duration.

If an OBSS is present in channel E and channel F, and all of channel G's subchannels are occupied as the secondary channels of OBSS E and F, a new BSS cannot be established in channel G. However, before selecting a primary channel in channel G, the AP can scan channels G, E and F to collect OBSS information, so as to not overlap the AP's primary channel with an OBSS's secondary channel, If channel F does not exist, an AP can scan channels E and G to collect OBSS information to select primary and secondary channels. In some implementations, an AP can scan channel G, and if the AP cannot find an OBSS's primary channel in channel B, it selects a primary channel in channel C.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
monitoring a group of wireless communication channels, including a first channel and a second channel, to produce a monitoring output;
determining a first transmission period for the first channel by applying a first waiting period duration and a second waiting period duration to the monitoring output, wherein the second waiting period duration is shorter than the first waiting period duration;
determining a second transmission period for the second channel by applying the first waiting period duration and the second waiting period duration to the monitoring output, wherein an end of the second transmission period is aligned with an end of the first transmission period;
causing, based on the first transmission period, a first transmission on the first channel to reserve the group of wireless communication channels;
causing, based on the second transmission period, a second transmission on the second channel; and
monitoring, after the end of the first transmission period, for one or more acknowledgements.

2. The method of claim 1, wherein determining the first transmission period comprises, in response to the monitoring output indicating a presence of traffic on the first channel during a period based on the first waiting period duration, determining the first transmission period based on an end of the second waiting period duration.

3. The method of claim 1, wherein determining the second transmission period comprises, in response to the monitoring output indicating a presence of traffic on the second channel during a period based on the first waiting period duration, determining the second transmission period based on an end of the second waiting period duration.

4. The method of claim 1, wherein:
causing the first transmission comprises transmitting to a first wireless communication device that is configured for communications based on a first wireless communication standard; and
causing the second transmission comprises transmitting to a second wireless device that is configured for communications based on a second wireless communication standard, wherein the first channel is used by each of the first wireless communication standard and the second wireless communication standard.

5. The method of claim 4, wherein:
the first transmission comprises a field indicative of a length of the first transmission; and
the method comprises setting the field to indicate a downlink orthogonal frequency-division multiple access transmission.

6. The method of claim 1, wherein the first transmission and the second transmission are transmitted to a same wireless communication device.

7. The method of claim 1, wherein the group of wireless communication channels are associated with an overlapping basic service set configured for communications based on 80 MHz, 120 MHz, or 160 MHz bandwidths.

8. An apparatus comprising:
   circuitry to access a group of wireless communication channels, including a first channel and a second channel; and
   processor electronics configured to
   monitor the group of wireless communication channels to produce a monitoring output,
   determine a first transmission period for the first channel by applying a first waiting period duration and a second waiting period duration to the monitoring output, wherein the second waiting period duration is shorter than the first waiting period duration,
   determine a second transmission period for the second channel by applying the first waiting period duration and the second waiting period duration to the monitoring output, wherein an end of the second transmission period is aligned with an end of the first transmission period,
   control, based on the first transmission period, a first transmission on the first channel to reserve the group of wireless communication channels,
   control, based on the second transmission period, a second transmission on the second channel, and
   monitor, after the end of the first transmission period, for one or more acknowledgements.

9. The apparatus of claim 8, wherein the processor electronics, in response to the monitoring output indicating a presence of traffic on the first channel during a period based on the first waiting period duration, are configured to determine the first transmission period based on an end of the second waiting period duration.

10. The apparatus of claim 8, wherein the processor electronics, in response to the monitoring output indicating a presence of traffic on the second channel during a period based on the first waiting period duration, are configured to determine the second transmission period based on an end of the second waiting period duration.

11. The apparatus of claim 8, wherein:
   the first transmission is transmitted to a first wireless communication device that is configured for communications based on a first wireless communication standard; and
   the second transmission is transmitted to a second wireless device that is configured for communications based on a second wireless communication standard, wherein the first channel is used by each of the first wireless communication standard and the second wireless communication standard.

12. The apparatus of claim 11, wherein:
   the first transmission comprises a field indicative of a length of the first transmission; and
   the processor electronics are configured to set the field to indicate a downlink orthogonal frequency-division multiple access transmission.

13. The apparatus of claim 8, wherein the first transmission and the second transmission are transmitted to a same wireless communication device.

14. The apparatus of claim 8, wherein the group of wireless communication channels are associated with an overlapping basic service set configured for communications based on 80 MHz, 120 MHz, or 160 MHz bandwidths.

15. A system comprising:
   circuitry to transmit and receive on a group of wireless communication channels, including a first channel and a second channel; and
   processor electronics configured to perform operations comprising:
   monitoring a group of wireless communication channels, including a first channel and a second channel, to produce a monitoring output;
   determining a first transmission period for the first channel by applying a first waiting period duration and a second waiting period duration to the monitoring output, wherein the second waiting period duration is shorter than the first waiting period duration;
   determining a second transmission period for the second channel by applying the first waiting period duration and the second waiting period duration to the monitoring output, wherein an end of the second transmission period is aligned with an end of the first transmission period;
   causing, based on the first transmission period, a first transmission on the first channel to reserve the group of wireless communication channels;
   causing, based on the second transmission period, a second transmission on the second channel; and
   monitoring, after the end of the first transmission period, for one or more acknowledgements.

16. The system of claim 15, wherein determining the first transmission period comprises, in response to the monitoring output indicating a presence of traffic on the first channel during a period based on the first waiting period duration, determining the first transmission period based on an end of the second waiting period duration.

17. The system of claim 15, wherein determining the second transmission period comprises, in response to the monitoring output indicating a presence of traffic on the second channel during a period based on the first waiting period duration, determining the second transmission period based on an end of the second waiting period duration.

18. The system of claim 15, wherein:
   causing the first transmission comprises transmitting to a first wireless communication device that is configured for communications based on a first wireless communication standard; and
   causing the second transmission comprises transmitting to a second wireless device that is configured for communications based on a second wireless communication standard, wherein the first channel is used by each of the first wireless communication standard and the second wireless communication standard.

19. The system of claim 18, wherein:
   the first transmission comprises a field indicative of a length of the first transmission; and
   the operations comprise setting the field to indicate a downlink orthogonal frequency-division multiple access transmission.

20. The system of claim 15, wherein the first transmission and the second transmission are transmitted to a same wireless communication device.

21. The system of claim 15, wherein the group of wireless communication channels are associated with an overlapping basic service set configured for communications based on 80 MHz, 120 MHz, or 160 MHz bandwidths.

* * * * *